US012613366B2

(12) United States Patent
Argoitia et al.

(10) Patent No.: US 12,613,366 B2
(45) Date of Patent: Apr. 28, 2026

(54) ARTICLE INCLUDING A STACK OF ALTERNATING LAYERS

(71) Applicant: VIAVI SOLUTIONS INC., San Jose, CA (US)

(72) Inventors: Alberto Argoitia, Santa Rosa, CA (US); Johannes P. Seydel, Petaluma, CA (US); Kangning Liang, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 16/841,211

(22) Filed: Apr. 6, 2020

(65) Prior Publication Data

US 2021/0311235 A1      Oct. 7, 2021

(51) Int. Cl.
*G02B 5/28* (2006.01)
*B05D 7/00* (2006.01)

(52) U.S. Cl.
CPC ............. *G02B 5/285* (2013.01); *B05D 7/542* (2013.01)

(58) Field of Classification Search
CPC ........ G02B 5/285; G02B 5/0825–0841; B32B 2250/42; C09C 1/0033
See application file for complete search history.

(56) References Cited

U.S. PATENT DOCUMENTS

| | | | |
|---|---|---|---|
| 5,814,686 A | 9/1998 | Micale et al. | |
| 6,132,504 A | 10/2000 | Kuntz et al. | |

| | | | |
|---|---|---|---|
| 6,490,090 B1 * | 12/2002 | Kumazawa | B32B 7/023 |
| | | | 428/207 |
| 6,531,221 B1 | 3/2003 | Schuhmacher et al. | |
| 6,596,070 B1 | 7/2003 | Schmidt et al. | |
| 6,686,042 B1 * | 2/2004 | LeGallee | C09C 1/0015 |
| | | | 428/404 |
| 6,777,085 B1 | 8/2004 | Argoitia et al. | |
| 6,784,608 B2 | 8/2004 | Araki et al. | |
| 7,238,424 B2 | 7/2007 | Raksha | |
| 8,153,163 B2 | 4/2012 | Misaki et al. | |
| 8,172,934 B2 | 5/2012 | Hashizume | |
| 8,557,332 B2 | 10/2013 | Watanabe et al. | |

(Continued)

FOREIGN PATENT DOCUMENTS

| | | |
|---|---|---|
| BR | 102012017356 A2 | 3/2014 |
| CN | 1267686 A | 9/2000 |

(Continued)

OTHER PUBLICATIONS

Silver nanoparticles: Optical properties, https://nanocomposix.com/pages/silver-nanoparticles-optical-properties, no date.*

(Continued)

*Primary Examiner* — Alex A Rolland
(74) *Attorney, Agent, or Firm* — Mannava & Kang, P.C.

(57) ABSTRACT

An article including a stack of layers of low refractive index layers and high refractive index layers, wherein the stack includes at least one low refractive index layer and at least two high refractive index layers; wherein at least one layer of the stack includes a composition comprising a carrier and at least one nanoparticle chosen from organic nanoparticles and inorganic nanoparticles is disclosed. Additionally, there is disclosed a method of making the article.

20 Claims, 2 Drawing Sheets

(56) References Cited

U.S. PATENT DOCUMENTS

| | | | |
|---|---|---|---|
| 9,212,089 B2 | 12/2015 | Arsten et al. | |
| 11,892,663 B2 | 2/2024 | Kuna et al. | |
| 12,091,557 B2 | 9/2024 | Book et al. | |
| 12,164,128 B2 | 12/2024 | Argoitia et al. | |
| 12,271,011 B2 | 4/2025 | Argoitia et al. | |
| 12,298,470 B2 | 5/2025 | Argoitia et al. | |
| 2002/0182383 A1 | 12/2002 | Phillips et al. | |
| 2002/0192448 A1 | 12/2002 | Schoen | |
| 2003/0060538 A1 | 3/2003 | Norris et al. | |
| 2003/0177949 A1 | 9/2003 | Phillips et al. | |
| 2003/0190473 A1 | 10/2003 | Argoitia et al. | |
| 2003/0215641 A1 | 11/2003 | Phillips et al. | |
| 2003/0224164 A1 | 12/2003 | Argoitia et al. | |
| 2004/0124398 A1 | 7/2004 | Kuntz et al. | |
| 2005/0019575 A1 | 1/2005 | Jungnitz et al. | |
| 2005/0258419 A1* | 11/2005 | Sankaran | H01L 31/035281 |
| | | | 257/E31.038 |
| 2007/0126694 A1 | 6/2007 | Moriyama et al. | |
| 2007/0177273 A1* | 8/2007 | Benson | B32B 27/34 |
| | | | 359/584 |
| 2008/0070153 A1 | 3/2008 | Ioku et al. | |
| 2008/0128286 A1 | 6/2008 | Wu et al. | |
| 2008/0292820 A1 | 11/2008 | Padiyath et al. | |
| 2008/0318012 A1 | 12/2008 | Domnick | |
| 2010/0180796 A1 | 7/2010 | Kitamura et al. | |
| 2010/0208349 A1* | 8/2010 | Beer | G02B 1/04 |
| | | | 359/580 |
| 2010/0297045 A1 | 11/2010 | Kaupp et al. | |
| 2011/0197782 A1 | 8/2011 | Wang et al. | |
| 2011/0223218 A1 | 9/2011 | Jones et al. | |
| 2011/0237683 A1 | 9/2011 | Schmid et al. | |
| 2012/0050386 A1 | 3/2012 | Shimizu et al. | |
| 2013/0116106 A1 | 5/2013 | Servin et al. | |
| 2013/0131187 A1 | 5/2013 | Hashizume et al. | |
| 2013/0200415 A1 | 8/2013 | Evans et al. | |
| 2013/0221837 A1 | 8/2013 | de Brouwer et al. | |
| 2015/0116856 A1 | 4/2015 | Lee et al. | |
| 2015/0177433 A1* | 6/2015 | Kumagai | G02B 1/14 |
| | | | 359/359 |
| 2016/0002432 A1 | 1/2016 | Vo et al. | |
| 2016/0061417 A1 | 3/2016 | Kim et al. | |
| 2016/0075165 A1 | 3/2016 | Machizaud et al. | |
| 2016/0185972 A1 | 6/2016 | Schmidt | |
| 2017/0328539 A1 | 11/2017 | Huang | |
| 2017/0348202 A1 | 12/2017 | Grüner et al. | |
| 2017/0355855 A1 | 12/2017 | Grüner et al. | |
| 2017/0369709 A1 | 12/2017 | Seydel et al. | |
| 2018/0073159 A1 | 3/2018 | Curran et al. | |
| 2018/0084658 A1 | 3/2018 | Curran et al. | |
| 2018/0239070 A1 | 8/2018 | England | |
| 2018/0346346 A1 | 12/2018 | Zhu et al. | |
| 2019/0006541 A1 | 1/2019 | So et al. | |
| 2019/0182996 A1 | 6/2019 | Kelkar et al. | |
| 2020/0142128 A1 | 5/2020 | Baer et al. | |
| 2020/0215571 A1 | 7/2020 | Argoitia et al. | |
| 2020/0283637 A1 | 9/2020 | Book et al. | |
| 2020/0284947 A1 | 9/2020 | Argoitia et al. | |
| 2021/0231849 A1 | 7/2021 | Argoitia et al. | |
| 2021/0311237 A1 | 10/2021 | Argoitia et al. | |
| 2025/0102714 A1 | 3/2025 | Argoitia et al. | |

FOREIGN PATENT DOCUMENTS

| | | | |
|---|---|---|---|
| CN | 1459034 A | 11/2003 | |
| CN | 1542059 A | 11/2004 | |
| CN | 1756805 A | 4/2006 | |
| CN | 101120059 A | 2/2008 | |
| CN | 102504620 A | 6/2012 | |
| CN | 103804963 A | 5/2014 | |
| CN | 105682451 A | 6/2016 | |
| CN | 106526962 A | 3/2017 | |
| CN | 108219541 A | 6/2018 | |
| CN | 110337468 A | 10/2019 | |
| DE | 102008060228 A1 | 6/2010 | |
| EP | 0861299 B1 | 4/2000 | |
| EP | 1254928 A1 | 11/2002 | |
| ES | 2341940 T | 6/2010 | |
| JP | H04332766 A | 11/1992 | |
| JP | H07157689 A | 6/1995 | |
| JP | H08199098 A | 8/1996 | |
| JP | H0959532 A | 3/1997 | |
| JP | 2001152049 A | 6/2001 | |
| JP | 2006521463 A | 9/2006 | |
| JP | 2006299051 A | 11/2006 | |
| JP | 2006347167 A | 12/2006 | |
| JP | 2007518841 A | 7/2007 | |
| JP | 2009221140 A | 10/2009 | |
| JP | 2013518953 A | 5/2013 | |
| JP | 2017149946 A | 8/2017 | |
| KR | 20180066820 A | 6/2018 | |
| RU | 2015143539 A | 4/2017 | |
| WO | 2004050350 A1 | 6/2004 | |
| WO | 2007094253 A1 | 8/2007 | |
| WO | 2015052319 A1 | 4/2015 | |
| WO | 2018199182 A1 | 11/2018 | |

OTHER PUBLICATIONS

Wikipedia article entitled "Germanium", https://en.wikipedia.org/wiki/Germanium; downloaded Dec. 11, 2023; 20 pages.

Alberto Argoitia, "U.S. Appl. No. 19/179,666, title Multilayer Articles Containing Organic Layers", filed Apr. 15, 2025, 37 pages.

Alberto Argoitia, "U.S. Appl. No. 19/181,149, title Multilayer Articles Containing Organic Layers", filed Apr. 16, 2025, 34 pages.

Marc Michel et al., "Review article: Deposition Mechanisms in Layer-by-Layer or Step-by-Step Deposition Methods: From Elastic and Impermeable Films to Soft Membranes with Ion Exchange Properties", ISRN Materials Science, vol. 2012, Article ID 701695, 13 pages.

R.K. Iler "Multilayers of Colloidal Particles", Journal of Colloid and Interface Science 21, year 1966, pp. 569-594.

Science Direct Topics, "Perylene- an overview", Downloaded from the Internet on Nov. 29, 2023, 18 pages. (https://www.sciencedirect.com/topics/chemistry/perylene#:~:text=Perylene%201%20is%20a%20polycyclic,high%2Dboiling%20mineral%20oil%20fractions.).

Wikipedia, "Germanium", downloaded from the Internet on Dec. 11, 2023, 20 pages .<https://en.wikipedia.org/wiki/Germanium>.

Wikipedia, "Perinone", downloaded from the Internet on Nov. 29, 2023, 2 pages.(https://en.wikipedia.org/wiki/Perinone).

Wikipedia, "Quinacridone", downloaded from the Internet on Nov. 29, 2023, 4 pages.(https://en.wikipedia.org/wiki/Quinacridone).

Yan Yan et al., "Assembly of Layer-by-Layer Particles and Their Interactions with Biological Systems", ACS Publications, Aug. 22, 2013, 9 pages.

China National Intellectual Property Administration, "The Notification of Reexamination for Application No. 202110111300.7", dated Nov. 14, 2025, 14 pages.

Ying Yang et al., "Structure, Properties, Synthesis and Applications of Carbon Nanotubes", Heilongjiang University Press, 1st edition, 1st printing, Aug. 2013, pp. 49-50.

* cited by examiner

ARTICLE INCLUDING A STACK OF ALTERNATING LAYERS

FIELD OF THE INVENTION

The present disclosure generally relates to an article, such as an optical device, including a stack of layers of low refractive index layers and high refractive index layers, wherein the stack includes at least one low refractive index layer and at least two high refractive index layers; wherein at least one layer of the stack includes a composition comprising a carrier; and at least one nanoparticle chosen from organic nanoparticles and inorganic nanoparticles. A method of making the article is also disclosed.

BACKGROUND OF THE INVENTION

Thin film interference structures can include an absorber layer, which traditionally, is a thin metallic layer that partially reflects, partially absorbs, and partially transmits light. All metal layers have this property, but the ratios at which they reflect, absorb, transmit varies as a function of wavelength. The absorber layer traps light in an optical cavity in order to leverage the interference effect. Generally, these absorber layers are made of pure materials like chromium, W, Ni, C, Fe or cermet, but sometimes include dark dielectrics that function like a neutral density filter, e.g., some metal compounds such as oxides, carbides, nitrides, borides, and their combinations.

Decorative pigment applications rely upon a desired color travel, good hiding, and high flop. Quarter wave (QW) stacks are thin film interference designs of layers of high refractive (H) index material and low refractive (L) index material to produce high reflectivity over a wide range of wavelengths and that can be selected by adjusting the thickness of the layers. Quarter wave stack designs that are made of transparent or semitransparent materials, depending on the number of HL layers, may have low or high color travel. Additionally, their hiding will depend on the characteristic layer absorption of the layers and on the number of HL layers of the optical design. In particular, in the case of QW stack designs with low hiding, the overall reflected light of an object painted with the decorative pigment would include light that is transmitted through the pigment and reflected off the underlying painted surface and through the pigment flake again.

The manufacturing of special effect pigments frequently requires expensive and time-consuming vapor deposition of layers under vacuum. Sometimes, the manufacturing of special effect pigments requires multiple stages with different layers deposited using different deposition techniques. This can be the case when the materials present in a layer must be deposited under vacuum What is needed is an article, such as a special effect pigment, in which all the materials in all the layers can be deposited using a single deposition technique in a single stage to decrease expense and time. The article, such as a special effect pigment, can be used in decorative pigment applications by including absorbing materials that would provide the desired color travel, good hiding, and excellent flop without the use of metallic deposited layers.

SUMMARY OF THE INVENTION

In an aspect, there is disclosed an article comprising a stack of layers of low refractive index layers and high refractive index layers, wherein the stack Includes at least one low refractive index layer and at least two high refractive index layers; wherein at least one layer of the stack includes a composition comprising a carrier and at least one nanoparticle chosen from organic nanoparticles and inorganic nanoparticles.

In another aspect, there is disclosed a method of making an article comprising depositing, using a liquid coating process, onto a substrate, a stack of layers of low refractive index layers and high refractive index layers, wherein the stack includes at least one low refractive index layer and at least two high refractive index layers; wherein at least one layer of the stack includes a composition comprising a carrier and at least one nanoparticle chosen from organic nanoparticles and inorganic nanoparticles.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

The present disclosure in its several aspects and embodiments can be more fully understood from the detailed description and the accompanying drawings, wherein.

Throughout this specification and figures like reference numbers identify like elements.

DETAILED DESCRIPTION OF THE INVENTION

Figure 1:
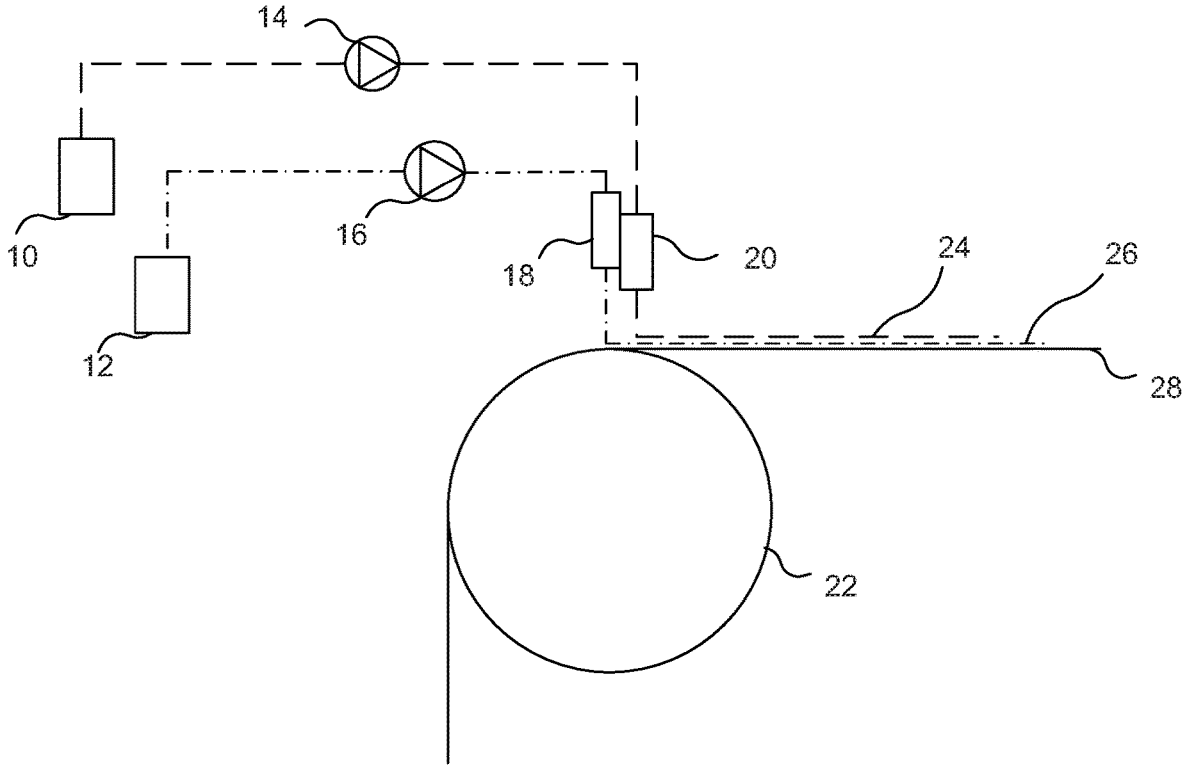
FIG. 1 illustrates a method of forming an article according to an aspect of the invention.

It is to be understood that both the foregoing general description and the following detailed description are exemplary and explanatory only, and are intended to provide an explanation of various embodiments of the present teachings. The layers/components shown in each Figure may be described with regard to a particular Figure, but it is understood that the description of a particular layer/component would be applicable to the equivalent layer/component in the other Figures.

In its broad and varied embodiments, disclosed herein is an article comprising a stack of layers of low refractive index layers and high refractive index layers, wherein the stack includes at least one low refractive index layer and at least two high refractive index layers; wherein at least one layer of the stack includes a composition comprising a carrier and at least one nanoparticle chosen from organic nanoparticles and inorganic nanoparticles. The article can include a layer of absorbing nanoparticles, such as optically active absorbing nanoparticles. The article can include a layer of metallic nanoparticles. The article can include a layer of colored dielectric nanoparticles. The article can include a 2-quarter wave dielectric layers. The article will be described more fully below. It will be appreciated that the article can include one or more of the layers discussed above in various combinations.

For the purpose of the application, "nanoparticle(s)" is understood to mean having a median particle size of less than about 500 nm, for example, from about 100 nm to about 300 nm, and as a further example less than about 100 nm.

For the purpose of the application, "layer of" is understood to comprise the recited material, such as metallic nanoparticles, but also to include other materials, such as those described below for a composition.

The article can be an optical device, for example, in a form of a flake, a pigment, or a foil. The pigment can be a special effect pigment. The article can be combined with a carrier to form a composition, such as an ink or paint.

The article can include one or more stacks of layers, for example alternating layers, of low refractive index layers and high refractive index layers. The one or more stacks can be adjacent to one another in the article without any additional layers. Additionally, and/or alternatively, the one or more stacks can be separated one from another by additional layers, such as a layer of absorbing nanoparticles, a layer of metallic nanoparticles, a layer of colored dielectric nanoparticles, and/or a 2-quarter wave dielectric layers. If additional layers are present, then the one or more stacks can be external layers with the additional layers internal to the article; or the additional layers can be external layers with the one or more stacks internal to the article. Non-limiting exemplary articles are disclosed further herein.

As discussed above, the stack in the article can include layers of low refractive (L) index layers and high refractive (H) index layers. The stack can have a bottom layer, one or more middle layers, and a top layer, in which it is understood that the words "bottom" and "top" are used for ease of reference and are not limiting as to placement in the stack. In an aspect, the bottom layer and the top layer are both low refractive index layers. In an aspect, the bottom layer and the top layer are both high refractive index layers. In an aspect, the bottom layer is a low refractive index layer and the top layer is a high refractive index layer or vice versa. In another aspect, the stack includes an odd number of alternating layers, for example, 3 alternating layers, 5 alternating layers, 7 alternating layers, and 9 alternating layers. In another aspect, the stack includes an even number of alternating layers, for example, 4 alternating layers, 6 alternating layers, 8 alternating layers, and 10 alternating layers. The stack can have the formula (HLH)n, in which n is an integer greater than or equal to 1.

The stack of alternating layers can include at least one layer including a composition comprising a carrier; at least one nanoparticle (chosen from organic nanoparticles and inorganic nanoparticles); and other materials chosen from other nanoparticles (e.g., nanoparticles of colored materials), energy curable materials, additives, and combinations thereof. In this manner, the composition can provide properties (functional and/or optical) to the at least one layer. For example, the composition of at least one layer can define the layer as a high refractive index layer or a low refractive index layer. The stack, in the article, can include at least one low refractive index layer and at least two high refractive index layers. Additionally, or alternatively, the composition can define a layer as a layer of absorbing nanoparticles, a layer of metallic nanoparticles, a layer of colored dielectric nanoparticles, and/or a 2-quarter wave dielectric layer.

The high refractive index layer can include a composition comprising at least one nanoparticle of a high refractive index material, i.e., having a refractive index greater than greater than about 1.65. Non-limiting examples of high refractive index materials include, zinc sulfide (ZnS), zinc oxide (ZnO), zirconium oxide (ZrO2), titanium dioxide (TiO2), diamond-like carbon, indium oxide (In2O3), indium-tin-oxide (ITO), tantalum pentoxide (Ta2O5), cerium oxide (CeO2), yttrium oxide (Y2O3), europium oxide (Eu2O3), iron oxides such as (II) diiron (III) oxide (Fe3O4) and ferric oxide (Fe2O3), hafnium nitride (HfN), hafnium carbide (HfC), hafnium oxide (HfO2), lanthanum oxide (La2O3), magnesium oxide (MgO), neodymium oxide (Nd2O3), praseodymium oxide (Pr6O11), samarium oxide (Sm2O3), antimony trioxide (Sb2O3), silicon, silicon monoxide (SiO), selenium trioxide (Se2O3), tin oxide (SnO2), tungsten trioxide (WO3), or their combinations.

The low refractive index layer can include a composition comprising at least one nanoparticle of a low refractive index material, i.e., having a refractive index less than about 1.65. Non-limiting examples of low refractive index materials include silicon dioxide (SiO2), aluminum oxide (Al2O3), metal fluorides such as magnesium fluoride (MgF2), aluminum fluoride (AlF3), cerium fluoride (CeF3), lanthanum fluoride (LaF3), sodium aluminum fluorides (e.g., Na3AlF6 or Na5Al3F14), neodymium fluoride (NdF3), samarium fluoride (SmF3), barium fluoride (BaF2), calcium fluoride (CaF2), lithium fluoride (LIF), or their combinations. Organic monomers and polymers can be utilized as low refractive index materials, including dienes or alkenes such as acrylates (e.g., methacrylate), perfluoroalkenes, polytetrafluoroethylene (Teflon), fluorinated ethylene propylene (FEP), or their combinations thereof.

In the article, at least one layer of the stack can include the composition comprising a carrier. Any suitable carrier can be used that can accommodate the suspension of the at least one nanoparticle; and other materials chosen from other nanoparticles (e.g., nanoparticles of colored materials), energy curable materials, additives, and combinations thereof. The carrier can be a medium chosen from polar and non-polar solvents. Non-limiting examples of a suitable carrier include acetates, such as ethyl acetate, propyl acetate, and butyl acetate; acetone; water; ketones, such as dimethyl ketone (DMK), methylethyl ketone (MEK), sec-butyl methyl ketone (SBMK), ter-butyl methyl ketone (TBMK), cyclopenthanon, and anisole; glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. The carrier can be an organic matrix. The carrier can have a low refractive index.

At least one layer of the stack can include a composition comprising at least one nanoparticle chosen from organic nanoparticles and inorganic nanoparticles. Non-limiting examples of the at least one nanoparticle include nanoparticles of a metal, metal oxide nanoparticles, metal sulfide nanoparticles, nanoparticles with absorbing properties, a nanoparticle of a high refractive index material, a nanoparticle of a low refractive index material, nanoparticles of colored materials (dyes and/or pigments), and combinations thereof.

The at least one nanoparticle can be an inorganic nanoparticle, such as nanoparticles of a metal. Non-limiting examples of nanoparticles of metal include aluminum, palladium, platinum, niobium, chromium, silver, titanium, vanadium, tungsten, molybdenum, rhodium, iron, cobalt, copper, tin, gold, nickel, their alloys, metal carbides, metal oxides, metal nitrides, metal sulfides, or their combinations. The nanoparticle of metal can be a complex colored oxide nanoparticle. The nanoparticles of metal for use in the composition of at least one layer of the stack is not in a form of a thin layer of metal, but is instead included in a composition with a carrier, i.e., is a nanoparticle suspended in the carrier.

The at least one nanoparticle can be an inorganic nanoparticle, such as metal oxide nanoparticles. Non-limiting examples of metal oxide nanoparticles include CuO, SiO2, TiO2, Al2O3, ZrO2, WO3, VO5, ITO, Ta2O5, CeO2, Y2O3, Sc2O3, ZnO, In2O3, La2O3, MgO, Nd2O3, Pr6O11, Fe2O3, Fe3O4, SiO, SnO2, FeOx (where x is an integer greater than 0), or their combinations.

The at least one nanoparticle can be an inorganic nanoparticle, such as metal sulfide nanoparticles. Non-limiting examples of metal sulfide nanoparticles include copper (I) sulfide, tin sulfide, nickel sulfide, silver sulfide, lead sulfide, molybdenum sulfide, iron disulfide, zinc sulfide, or combinations thereof. Complex ternary systems can also be used such as chalcopyrite and bornite.

The at least one nanoparticle can be an inorganic nanoparticle, such as nanoparticles with absorbing properties. In an aspect, the nanoparticles with absorbing properties can be optically active. Non-limiting examples of nanoparticles with absorbing properties include silicon, germanium, cermets, metals mixed in a dielectric matrix, alloys such as Inconel, stainless steel, Hastalloys, titanium-based alloys (titanium mixed tungsten, titanium mixed with niobium, titanium mixed with silicon) and other substances that are capable of acting as a uniform or selective absorber in the visible spectrum. The nanoparticles with absorbing properties can be used to create a layer of absorbing nanoparticles.

The at least one nanoparticle can be an organic nanoparticle, such as an organic colored material, such as dyes. Any dye recognized in the Colour Index™ published by the Society of Dyers and Colourists can be used. Non-limiting examples of organic colored materials include carbon, graphite, perylene, perinone, quinacridone, pyrrole, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindolinone, pyranthrone, isoviolanthrone, miyoshi methane, triarylmethane, or mixtures thereof. The organic colored material can also be cobalt green, cobalt blue, Prussian blue, and manganese violet.

The at least one nanoparticle also include other nanoparticles, such as nanoparticles of inorganic colored materials, such as pigments. Any pigment recognized in the Colour Index™ published by the Society of Dyers and Colourists can be used. Non-limiting examples of pigments include C.I. Pigment Red 123 (C.I. No. 71 145), C.I. Pigment Red 149 (C.I. No. 71 137), C.I. Pigment Red 178 (C.I. No. 71 155), C.I. Pigment Red 179 (C.I. No. 71 130), C.I. Pigment Red190 (C.I. 71 140), C.I. Pigment Red 224 (C.I. No. 71 127), C.I. Pigment Violet 29 (C.I. No. 71 129), C.I. Pigment Orange 43 (C.I. No. 71 105), C.I. Pigment Red 194 (C.I. No. 71 100), C.I. Pigment Violet 19 (C.I. No. 73 900), C.I. Pigment Red 122 (C.I. No. 73 915), C.I. Pigment Red 192, C.I. Pigment Red 202 (C.I. No. 73 907), C.I. Pigment Red 207, C.I. Pigment Red 209 (C.I. No. 73 905), C.I. Pigment Red 206 (C.I. No. 73 900/73 920), C.I. Pigment Orange 48 (C.I. No. 73 900/73 920), C.I. Pigment Orange 49 (C.I. No. 73 900/73 920), C.I. Pigment Orange 42, C.I. Pigment Yellow 147, C.I. Pigment Red 168 (C.I. No. 59 300), C.I. Pigment Yellow 120 (C.I. No. 11 783), C.I. Pigment Yellow 151 (C.I. No. 13 980), C.I. Pigment Brown 25 (C.I. No. 12 510), C.I. Pigment Violet 32 (C.I. No. 12 517), C.I. Pigment Orange 64; C.I. Pigment Brown 23 (C.I. No. 20 060), C.I. Pigment Red 166 (C.I. No. 20 730), C.I. Pigment Red 170 (C.I. No. 12 475), C.I. Pigment Orange 38 (C.I. No. 12 367), C.I. Pigment Red 188 (C.I. No. 12 467), C.I. Pigment Red 187 (C.I. No. 12 486), C.I. Pigment Orange 34 (C.I. No. 21 115), C.I. Pigment Orange 13 (C.I. No. 21 110), C.I. Pigment Red 9 (C.I. No. 12 460), C.I. Pigment Red 2 (C.I. No. 12 310), C.I. Pigment Red 112 (C.I. No. 12 370), C.I. Pigment Red 7 (C.I. No. 12 420), C.I. Pigment Red 210 (C.I. No. 12 477), C.I. Pigment Red 12 (C.I. No. 12 385), C.I. Pigment Blue 60 (C.I. No. 69 800), C.I. Pigment Green 7 (C.I. No. 74 260), C.I. Pigment Green 36 (C.I. No. 74 265); C.I. Pigment Blue 15:1, 15:2, 15:3, 15:4, 15:6 and 15 (C.I. No. 74 160); C.I. Pigment Blue 56 (C.I. No. 42 800), C.I. Pigment Blue 61 (C.I. No. 42 765:1), C.I. Pigment Violet 23 (C.I. No. 51 319), C.I. Pigment Violet 37 (C.I. No. 51 345), C.I. Pigment Red 177 (C.I. No. 65 300), C.I. Pigment Red 254 (C.I. No. 56 110), C.I. Pigment Red 255 (C.I. No. 56 1050), C.I. Pigment Red 264, C.I. Pigment Red 270, C.I. Pigment Red 272 (C.I. No. 56 1150), C.I. Pigment Red 71, C.I. Pigment Orange 73, C.I. Pigment Red 88 (C.I. No. 73 312), C.I. Pigment Yellow 175 (C.I. No. 11 784), C.I. Pigment Yellow 154 (C.I. No. 11 781), C.I. Pigment Yellow 83 (C.I. No. 21 108), C.I. Pigment Yellow 180 (C.I. No. 21 290), C.I. Pigment Yellow 181 (C.I. No. 11 777), C.I. Pigment Yellow 74 (C.I. No. 11 741), C.I. Pigment Yellow 213, C.I. Pigment Orange 36 (C.I. No. 11 780), C.I. Pigment Orange 62 (C.I. No. 11 775), C.I. Pigment Orange 72, C.I. Pigment Red 48:2/3/4 (C.I. No. 15 865:2/3/4), C.I. Pigment Red 53:1 (C.I. No. 15 585:1), C.I. Pigment Red 208 (C.I. No. 12 514), C.I. Pigment Red 185 (C.I. No. 12 516), C.I. Pigment Red 247 (C.I. No. 15 915), Pigment Black 31 (C40H26N2O4), Pigment Orange 16 (C32H24C12N8O2), or combinations thereof.

As discussed above, the composition can comprise an energy curable material. For example, the at least one layer can include a composition comprising a carrier, at least one nanoparticle, and an energy curable material. The energy curable material can include any material that can suspend the at least one nanoparticle, can be used in a liquid coating process, and/or can cure upon application of energy. Non-limiting examples of energy curable materials include thermoplastics, thermosets, other materials, or combinations thereof. Non-limiting examples of the thermoplastics include polyesters, polyolefins, polycarbonates, polyamides, polyimides, polyurethanes, acrylics, acrylates, polyvinylesters, polyethers, polythiols, silicones, fluorocarbons, and various co-polymers thereof. Non-limiting examples of thermosets include epoxies, polyurethanes, acrylates, melamine formaldehyde, urea formaldehyde, and phenol formaldehyde. Non-limiting examples of other energy curable materials include acrylates, epoxies, vinyls, vinyl esters, styrenes, silanes, siloxanes, titanates, zirconates, aluminates, silicates, phosphazanes, polyborazylenes, polythiazyls, or combinations thereof.

As discussed above, the composition can comprise an additive, such as one or more additives. For example, the composition can comprise a carrier, at least one nanoparticle, an energy curable material, and an additive. The additive can assist in deposition of the at least one layer, and/or curing of the composition. Non-limiting examples of an additive include a curing agent, a coating aid, leveling agents, wetting agents, defoamers, adhesion promoters, antioxidants, UV stabilizers, curing inhibition mitigating agents, antifouling agents, corrosion inhibitors, photosensitizers, photoinitiator, secondary crosslinkers, oxygen inhibition mitigation composition, and infrared absorbers for enhanced infrared drying.

As discussed above, the article can include the stack, such as one or more stacks, and an additional layer, such as one or more additional layer. The additional layer can be a layer of absorbing nanoparticles, a layer of metallic nanoparticles, a layer of colored dielectric nanoparticles, and/or a 2-quarter wave dielectric layer.

A layer of absorbing nanoparticles can include a composition comprising a carrier and nanoparticles with absorbing properties. A layer of colored dielectric materials can include a composition comprising a carrier and at least one nanoparticle of colored materials (dyes and/or organic or inorganic pigments) and high refractive index nanoparticles, or low refractive index nanoparticles. For example, the layer of colored dielectric materials can include dielectric nanoparticles that are designed to have a certain optical thickness and thereby exhibit a certain color, such as blue at a wavelength of 450 nm. Additionally, or alternatively, the layer of colored dielectric materials can include dielectric nanoparticles and nanoparticles of colored materials. The layer of metallic nanoparticles can include a composition comprising a carrier and nanoparticles of a metal.

In forming the article, care should be taken to bifurcate the layers of the stack to preserve a difference in the refraction index of each layer, which can drive the reflectivity of the article. For example, a first layer can include at least one nanoparticle each having a similar high refractive index, such as phthalocyanine blue and transparent titanium dioxide. This first layer can have an average refractive index around 2.0. The second layer can include a low refractive index polymer so that the second layer can have an average refractive index between 1.3 to about 1.5.

The article can have the following exemplary structures, in which the layers of the article are as described above. As a legend in the structures, "absorbing" is a layer of absorbing nanoparticles, "metallic" is a layer of metallic nanoparticles, "colored dielectric" is a layer of dielectric nanoparticles designed to exhibit a color at a certain wavelength of light or a dielectric layer containing colored nanoparticles, and "2QW" is a 2 quarter-wave stack of dielectric layers to produce the requisite optical thickness for the desired wavelength:

stack/absorbing/stack
    stack/metallic/stack
    stack/colored dielectric/stack
    stack/2QW L/stack
    stack/2QW L with matching organic color nanoparticles/
      stack
    absorbing/stack/absorbing
    absorbing/stack/absorbing/stack/absorbing
    absorbing/stack/metallic/stack/absorbing The article can include a stack of layers of low refractive index layers and high refractive index layers, as described above. The article can also include an additional layer, such as a layer of absorbing particles, as described above. The article can include two stacks of layers of low refractive index layers and high refractive index layers in which the two stacks are separated by the layer of absorbing nanoparticles.

The article can include a stack of layers of low refractive index layers and high refractive index layers, as described above. The article can also include an additional layer, such as a layer of metallic nanoparticles, as described above. The article can include two stacks of layers of low refractive index layers and high refractive index layers in which the two stacks are separated by a layer of metallic nanoparticles.

The article can include a stack of layers of low refractive index layers and high refractive index layers, as described above. The article can also include an additional layer, such as a layer of colored dielectric nanoparticles, as described above. The article can include two stacks of layers of low refractive index layers and high refractive index layers in which the two stacks are separated by the layer of colored dielectric nanoparticles.

The article can include a stack of alternating layers of low refractive index layers and high refractive index layers, as described above. The article can also include an additional layer, such as a 2-quarter wave dielectric layer, as described above. The article can include two stacks of layers of low refractive index layers and high refractive index layers in which the two stacks are separated by the 2-quarter wave dielectric layer. In an aspect, the 2-quarter wave dielectric layer includes low refractive index materials, such as the low refractive index materials described above for use in the stack of the article. Additionally, and/or alternatively, the 2-quarter wave dielectric layer can include organic colored nanoparticles, as described above.

The article can include a stack of alternating layers of low refractive index layers and high refractive index layers, as described above. The article can also include an additional layer, such as a layer of absorbing nanoparticles, as described above. The article can include two layers of absorbing nanoparticles separated by the stack. In this manner, the stack is internal and the two additional layers are external layers of the article.

The article can include a stack of alternating layers of low refractive index layers and high refractive index layers, as described above. The article can also include an additional layer, such as a layer of absorbing nanoparticles, as described above. The article can include three layers of absorbing nanoparticles and two stacks in which each layer of absorbing nanoparticles is separated one from another by a stack, e.g., by one of the two stacks.

The article can include a stack of alternating layers of low refractive index layers and high refractive index layers, as described above. The article can also include an additional layer, such as a layer of metallic nanoparticles, as described above, and a layer of absorbing nanoparticles, as described above. The stack can be two stacks. The article can include the two stacks with the layer of metallic nanoparticles between the two stacks. The layer of absorbing nanoparticles can be two layers of absorbing nanoparticles, in which each layer of absorbing nanoparticles is on one of the two stacks. In this manner, the two layers of absorbing nanoparticles are external layers of the article.

A method of forming an article can include depositing, using a liquid coating process, onto a substrate, a stack of alternating layers of low refractive index layers and high refractive index layers, wherein the stack includes at least one low refractive index layer and at least two high refractive index layers; wherein at least one layer of the stack includes a composition comprising a carrier and at least one nanoparticle chosen from organic nanoparticles and inorganic nanoparticles.

FIG. 1 illustrates a method of forming an article using a multi-channel liquid coating process using a slot die with multiple channels or slots. Two or more layers can be applied simultaneously and/or sequentially in a roll-to-roll configuration. For example, a first container 10 can include a first composition 24 that is pumped through a first feed pump 14 through a first slot die 20. A second container 12 can include a second composition 26 that is pumped through a second feed pump 16 through a second slot die 18. Both compositions 24, 26 can be applied simultaneously through first and second slot dies 18, 20 in a manner so that the first composition 24 can be deposited as a first layer onto the second composition 26 that is deposited as a second layer, i.e., they can be in offset locations one from the other. The second composition 26 can be deposited on the substrate 28 that is fed along a roller 22. The method does not use a vacuum step.

The substrate 28 can be any suitable material that can receive deposited layers. The substrate 28 can receive a release layer and deposited layers (first layer, second layer, etc.). The deposited layers can include, but is not limited to, any of the layers disclosed herein, such as a stack of layers of low refractive index layers and high refractive index layers, a layer of absorbing nanoparticles, a layer of metallic nanoparticles, a layer of colored dielectric nanoparticles, a 2-quarter wave dielectric layer, etc. The deposited layers can include a plurality of each of the layers. Additionally, the deposited layers can be in any order.

The method can also include depositing, between the substrate and the stack, a layer of absorbing nanoparticles. In the method, the step of depositing the stack includes depositing a high refractive index layer, depositing a low refractive index layer, drying, depositing a high refractive index layer, and curing. The method can further include water stripping the release layer and deposited layers, filtering the deposited layers, drying, and grinding to form the article, for example, a flake.

The substrate 28 for use in the method can be made of a flexible material. Non-limiting examples of substrate 28 materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc.

The article can be formed using a liquid coating process for each layer. The liquid coating process can include, but is not limited to: slot-bead, slide bead, slot curtain, slide curtain, in single and multilayer coating, tensioned web slot, gravure, roll coating, and other liquid coating and printing processes that apply a composition onto a substrate 28 or previously deposited layer to form a liquid layer or film that is subsequently dried and/or cured.

In an aspect, a method of forming the article can include using a multi-channel slot die to apply two or more layers simultaneously and/or sequentially. This method can achieve a higher productivity with a less stages, such as a single stage. In the disclosed method, the layers of the article do not require to be deposited under vacuum and thereby avoid the cost and loss of productivity associated with vacuum deposition techniques.

An exemplary article can be a dichroic optical device with a stack made of alternating layers having quarter wave optical thicknesses (QWOT) at different selected wavelengths for UV, visible, or infrared (IR) applications. In an aspect, the layer of high refractive index nanoparticles (H) can be a composite of organic materials and inorganic materials, such as titanium dioxide. The layer of low refractive index nanoparticles (L) can be a neat layer of organic nanoparticles or a layer of the carrier, such as an organic matrix, as previously described.

Figure 2:
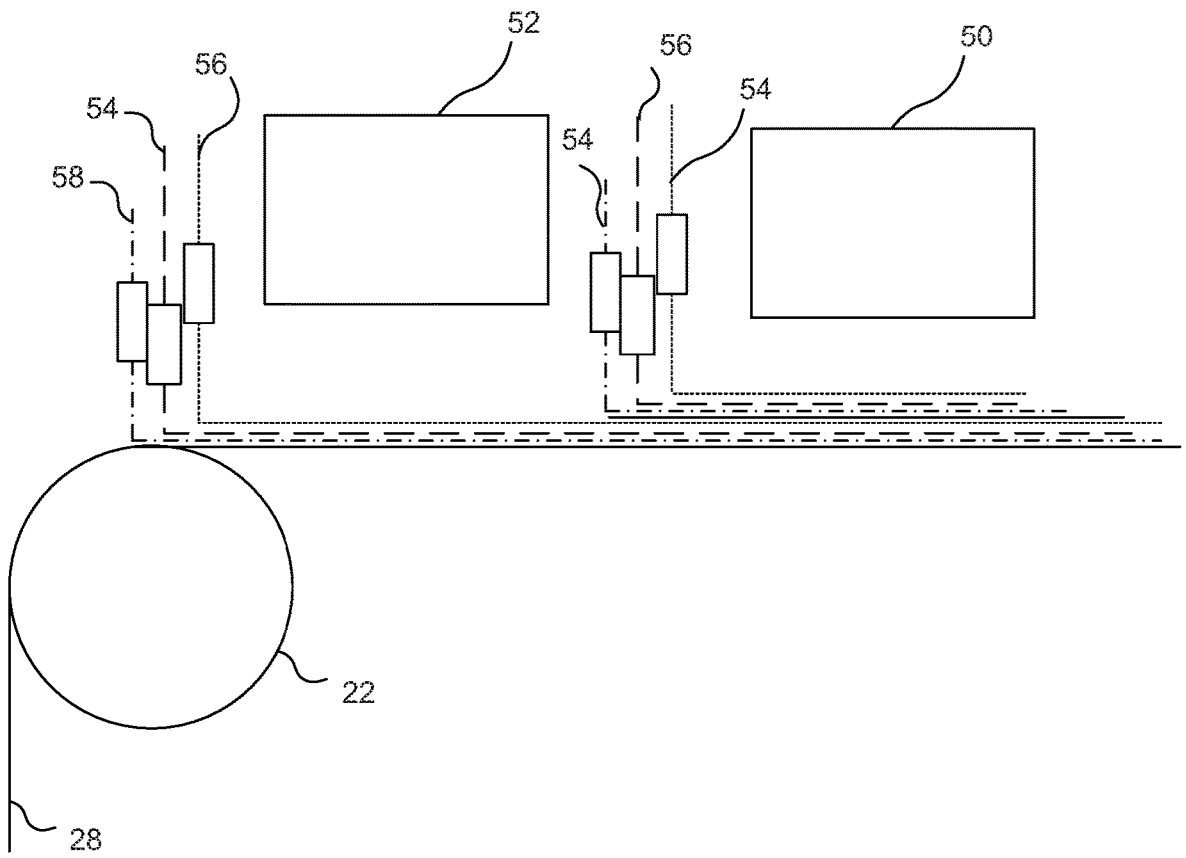
FIG. 2 illustrates a method of forming an article according to another aspect of the invention.

FIG. 2 illustrates a method of forming an article using a multi-channel liquid coating process using multiple channel slot dies. A roller 22 provides a substrate 28. A first slot die (not shown) can include three separate channels each independently include a release layer 58, a composition 54 comprising a carrier and high refractive index nanoparticles, and a composition 56 comprising a carrier, such as a low index organic carrier, and/or low refractive index nanoparticles, respectively. The compositions 58, 54, 56 can be deposited simultaneously, or just slightly sequentially in time and space, so that the release layer 58 can be deposited onto the substrate 28, the high refractive index nanoparticles 54 can be deposited onto the release layer 58, and the low refractive organic carrier and/or low refractive index nanoparticles 56 can be deposited onto the high refractive index nanoparticles 54 to form a first set of deposited layers. The first set of deposited layers can be subjected to a first drying and/or curing stage 52. A second slot die (not shown) can include three separate channel each independently including a composition 54 comprising a carrier and high refractive index nanoparticles, and a composition 56 comprising a low refractive index organic carrier and/or low refractive index nanoparticles, and a composition 54 comprising a carrier and high refractive index nanoparticles, respectively. The compositions 54, 56 can be deposited simultaneously, or just slightly sequentially in time and space, so that the composition 54 of high refractive index nanoparticles can be deposited onto the composition 56 of low refractive index nanoparticles of the first set of deposited layers, and the composition 56 of low refractive index nanoparticles from the second slot die can be deposited onto the composition 54 of high refractive index nanoparticles of the second slot die; and the composition 54 of high refractive index nanoparticles from the second slot can be deposited onto the composition 56 of low refractive index carrier and/or low refractive index nanoparticles to form a second set of deposited layers, which have been deposited onto the first set of deposited layers to form an article (with an optional release layer 58 and substrate 28). The article can be subjected to a second drying and/or curing stage 50. The method does not use a vacuum step.

An exemplary optical device can be a dielectric mirror design (or Bragg reflector design) comprising a stack of layers of high refractive index nanoparticles and low refractive index nanoparticles. The optical thicknesses of each layer can be chosen to be quarter-wavelength long. The standard arrangement can have an odd number of layers, with the layer of high refractive index nanoparticles being the first and last layer of the stack and/or article. However, a dielectric mirror can be designed to have an unequal thickness of the high refractive index and the low refractive index layers which can change the width of the reflected region at the particular centered wavelength.

An exemplary article can be a 5-layer dielectric mirror design based on high refractive index layers and low refractive index layers that can be deposited onto a polyethylene terephthalate (PET) substrate 28 coated with a polyvinyl acetate (PVAc) release layer 58. The composition 56 of low refractive index nanoparticles can be a neat layer of organic material, such as acrylics, epoxies, or combinations. The composition 54 of high refractive index nanoparticles can be a composite of organic nanoparticles and inorganic nanoparticles. In particular, the organic nanoparticles can be acrylics and the inorganic nanoparticles can be titanium dioxide nanoparticles. The physical thicknesses for each layer can be selected based on the low refractive index of 1.5 for the neat organic acrylic nanoparticles and the high refractive index of 1.8 for the composite layer.

In an aspect, the optical device in the preceding paragraph can be formed with a layer of low refractive index nanoparticles suspended in a carrier, such as silicon dioxide nanoparticles. The inclusion of this inorganic nanoparticle can alter the mechanical properties of the optical device, for example, by facilitating stripping and grinding post processes.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a device can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An article comprising:
a stack of alternating layers of low refractive index layers and high refractive index layers, wherein the stack includes at least one low refractive index layer and at least two high refractive index layers; and
a layer of absorbing nanoparticles that are capable of acting as uniform or selective absorbers in the visible spectrum;
wherein at least one layer of the stack includes a composition comprising a carrier and at least one nanoparticle chosen from organic nanoparticles and inorganic nanoparticles,
wherein the article is a flake, a pigment or a foil,
wherein the carrier is an organic matrix,
wherein the absorbing nanoparticles are nanoparticle materials chosen from silicon, germanium, cermets, metals mixed in a dielectric matrix, and alloys, and further wherein the absorbing nanoparticles have a particle size ranging from greater than 100 nm to about 500 nm,
wherein the layer of absorbing nanoparticles is an external layer of the article.

2. The article of claim 1, wherein the absorbing nanoparticles are nanoparticle materials chosen from silicon and germanium.

3. The article of claim 2, wherein the stack is two stacks of layers of low refractive index layers and high refractive index layers; and
wherein the two stacks are separated by the layer of absorbing nanoparticles.

4. The article of claim 1, further comprising a layer of metallic nanoparticles.

5. The article of claim 4, wherein the stack is two stacks of layers of low refractive index layers and high refractive index layers; and
wherein the two stacks are separated by the layer of metallic nanoparticles.

6. The article of claim 4, wherein the stack is two stacks with the layer of metallic nanoparticles between the two stacks; and
further comprising two layers of absorbing nanoparticles, in which each layer of absorbing nanoparticles is on one of the two stacks.

7. The article of claim 1, further comprising a layer of colored dielectric nanoparticles.

8. The article of claim 7, wherein the stack is two stacks of layers of low refractive index layers and high refractive index layers; and
wherein the two stacks are separated by the layer of colored dielectric nanoparticles.

9. The article of claim 1, further comprising a 2-quarter wave dielectric layer.

10. The article of claim 9, wherein the stack is two stacks of layers of low refractive index layers and high refractive index layers; and
wherein the two stacks are separated by the 2-quarter wave dielectric layer.

11. The article of claim 9, wherein the 2-quarter wave dielectric layer includes low refractive index materials.

12. The article of claim 9, wherein the 2-quarter wave dielectric layer includes organic colored nanoparticles.

13. An article comprising:
a stack of alternating layers of low refractive index layers and high refractive index layers, wherein the stack includes at least one low refractive index layer and at least two high refractive index layers; and
a layer of absorbing nanoparticles that are capable of acting as uniform or selective absorbers in the visible spectrum;
wherein at least one layer of the stack includes a composition comprising a carrier and at least one nanoparticle chosen from organic nanoparticles and inorganic nanoparticles,
wherein the article is a flake, a pigment or a foil,
wherein the carrier is an organic matrix,
wherein the layer of absorbing nanoparticles is two layers of absorbing nanoparticles separated by the stack, and
wherein the absorbing nanoparticles are nanoparticle materials chosen from silicon, germanium, cermets, metals mixed in a dielectric matrix, and alloys, and further wherein the absorbing nanoparticles have a particle size ranging from greater than 100 nm to about 500 nm.

14. The article of claim 13, further comprising a third layer of absorbing nanoparticles, and wherein the stack is two stacks; and
wherein each layer of the absorbing nanoparticles is separated one from another with one of the two stacks.

15. A method of making an article, comprising:
depositing, using a liquid coating process, onto a substrate, a stack of layers of low refractive index layers and high refractive index layers, wherein the stack includes at least one low refractive index layer and at least two high refractive index layers; and
depositing a layer of absorbing nanoparticles that are capable of acting as uniform or selective absorbers in the visible spectrum;
wherein at least one layer of the stack includes a composition comprising a carrier and at least one nanoparticle chosen from organic nanoparticles and inorganic nanoparticles,
wherein the article is a flake, a pigment or a foil,
wherein the carrier is an organic matrix, wherein the absorbing nanoparticles are nanoparticle materials chosen from silicon, germanium, cermets, metals mixed in a dielectric matrix, and alloys, and further wherein the absorbing nanoparticles have a particle size ranging from greater than 100 nm to about 500 nm, and wherein the layer of absorbing nanoparticles is an external layer of the article.

16. The method of claim 15, wherein the liquid coating process is a multi-channel slot die.

17. The method of claim 15, wherein the substrate includes a release layer.

18. The method of claim 15, wherein the layer of absorbing nanoparticles is deposited between the substrate and the stack.

19. The method of claim 15, wherein the step of depositing the stack includes depositing a high refractive index layer, depositing a low refractive index layer, drying, depositing a high refractive index layer, and curing.

20. The method of claim 17, further comprising water stripping the release layer and deposited layers, filtering the deposited layers, drying, and grinding to form the article.

* * * * *